(12) United States Patent
Schwenk et al.

(10) Patent No.: US 6,901,513 B1
(45) Date of Patent: May 31, 2005

(54) PROCESS FOR GENERATING A DIGITAL SIGNATURE AND PROCESS FOR CHECKING THE SIGNATURE

(75) Inventors: Jörg Schwenk, Dieburg (DE); Klaus Huber, Darmstadt (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 09/355,863

(22) PCT Filed: Jan. 21, 1998

(86) PCT No.: PCT/EP98/00303
§ 371 (c)(1),
(2), (4) Date: Oct. 12, 1999

(87) PCT Pub. No.: WO98/34373
PCT Pub. Date: Aug. 6, 1998

(30) Foreign Application Priority Data

Feb. 4, 1997 (DE) ......................................... 197 03 924

(51) Int. Cl.⁷ ................................................. H04L 9/30
(52) U.S. Cl. .......................... 713/170; 713/176; 380/30
(58) Field of Search ................................ 713/170, 176; 380/30

(56) References Cited

U.S. PATENT DOCUMENTS

| | | | |
|---|---|---|---|
| 4,625,076 A | * 11/1986 | Okamoto et al. | ........... 713/176 |
| 4,933,970 A | 6/1990 | Shamir | |
| 5,497,423 A | 3/1996 | Miyaji | |
| 5,787,178 A | * 7/1998 | Schwenk | ..................... 380/30 |

FOREIGN PATENT DOCUMENTS

| | | |
|---|---|---|
| DE | 195 13 896 | 10/1996 |
| GB | 2 264 423 | 8/1993 |

OTHER PUBLICATIONS

J. Schwenk et al., "Public Key Encryption And Signature Schemes Based on Polynomials Over N", Advances in Cryptology—Eurocrypt '96 International Conference on the Theory and Application of Cryptographic Techniques, Saragossa, May 12–16, 1996, pp. 60–71.

R. Lidl, et al., "Permutation Polynomials in RSA–Cryptsystems" Advances in Cryptology. Proceedings of Crypto 83, Santa Barbara, CA, USA, Aug. 21–24, 1983, pp. 293–301.

E. Bertekamp, "Algebraic Coding Theory", 1984, pp. 21–29.

W. Diffie et al., "New Directions in Crytography", IEEE Transactions on Information Theory, vol. IT–22, Nov. 1976, pp. 644–654.

R. Rivest et al., "A Method for Obtaining Digital Signatures and Public–Key Cryptosystems", Communications of the ACM, vol. 27, No. 2, Feb. 1978, pp. 120–126.

W. B. Müller et al. "Cryptanalysis of the Dickson Scheme", Proc. Eurocrypt 8S, Lecture Notes in Computer Science, vol. 219, 1986, pp. 50–61.

I. Schur, "Arithmetisches über die Tschebyscheffschen Polynome", Gesammelte Abhandlungen, vol. III, Springer–Verlag, Berlin, Heidelberg, New York, 1973, pp. 422–453.

V. Varadharajan, "Cryptosystems Based on Permutation Polynomials", International Journal of Computer Mathematics, 1988, London, vol. 23, No. 3–4, pp. 237–250.

*A. Beutelspacher, "Kryptologie", Vieweg–Verlag, 1994 (attached please find the English–language version of the Beutelspacher reference from The Mathematical Association of America).

* cited by examiner

*Primary Examiner*—Gilberto Barrón
*Assistant Examiner*—Benjamin E. Lanier
(74) *Attorney, Agent, or Firm*—Kenyon & Kenyon

(57) ABSTRACT

A method for generating a digital signature s of a message m using a secret key including at least two large prime numbers p, q is provided. It is provided that s is the zero of the polynomial $P(x)-m$ modulo n, $P(x)$ being any permutation polynomial modulo n.

9 Claims, No Drawings

PROCESS FOR GENERATING A DIGITAL SIGNATURE AND PROCESS FOR CHECKING THE SIGNATURE

FIELD OF THE INVENTION

The present invention relates to a method for generating a digital signature of a message using a secret key including at least two large prime numbers, as well as to a method for verifying the signature.

BACKGROUND INFORMATION

Public-key signature methods are described in publications by Diffie and Hellmann (W. Diffie, M. E. Hellmann, "New Directions in Cryptography", IEEE Transactions on Information Theory, vol. IT-22, November 1976, pages 644–654) and by Rivest, Shamir and Adleman (R. Rivest, A. Shamir and L. Adleman, "A Method for Obtaining Digital Signatures and Public-Key Cryptosystems", Communications of the ACM, vol. 27, no. 2, February 1978, pages 120–126, RSA methods). These conventional methods utilize two keys, one of which is used for signing a message and another for verifying this signature. A secret key known only to the sender of the message is used for signing, while a public key is used for verifying the signature. Such public-key signature methods are used predominantly in data communications via electronic media, the digital signature being used as a substitute for a hand-written signature. The public key enables the recipient of the message to verify the authenticity of the signature and, thus, of the document transmitted to him or her. Examples of applications of the aforementioned signature methods have been described in detail in A. Beutelspacher, "Kryptologie", (Cryptology) Vieweg-Verlag 1994.

German Patent application No. 195 13 896 describes a public-key signature method which uses a polynomial, whose coefficients are formed from the message to be signed and from a random number. From the thus formed polynomial, two further polynomials are derived, which must include at least one zero in a finite field, because these are used to form the signature. If this is not the case, the described method must be repeated with a different random number.

Schwenk J. et al.: "Public Key Encryption and Signature Schemes Based on Polynomials over $Z_n$ Advances in Cryptology-Eurocrypt, 1996 International Conference on the, Theory and Application of Cryptographic Techniques, Saragossa, May 12–16, 1996, May 12, 1996, Maurer U. (ed), pages 60–71, describes a method for generating a digital signature of a message, this being accomplished by a secret key comprising at least two large prime numbers and the digital signature being the zero value of a polynomial $P(x)-m$ modulo n. General polynomials $f(x)$ are used as polynomials. Although the zero value is discovered when the digital signature is decrypted, it has become evident in the case of general polynomials $f(x)$ that this zero value is not unique, i.e. the digital signature cannot be uniquely generated.

Varadharajan, V.: "Cryptosystem Based on Permutation Polynomials" International Journal of Computer Mathematics, 1988, London, vol. 23, no. 3–4, pages 235–250, describes a use of permutation polynomials for encrypting a message. A disadvantage, however, is that only those permutation polynomials can be used for which there is an inverse function.

Therefore, an object of the present invention is to provide a signature method for signing a message, where the method avoids the mentioned disadvantage, exhibits a level of security and speed of execution comparable to the existing methods, and, in this context, permits a valid signature to be generated at all times.

Signature methods which use polynomials over the ring of numbers modulo of a number n made up of at least two large prime numbers are already known from the publications described above. Other examples are those methods which are based on so-called Dickson polynomials (W. B. Müller, R. Nöbauer, Cryptanalysis of the Dickson scheme. Proc. Eurocrypt 8S, Lecture Notes in Computer Science, vol, 219, 1986, pages 50–61). The present invention goes beyond the teachings of the mentioned papers to the extent that the method for generating a signature is substantially more general in nature and makes it possible to employ other classes of polynomials as well.

SUMMARY OF THE INVENTION

The object of the present invention is achieved in that a zero value s of the polynomial $P(x)-m$ mod n (or, equivalent thereto, a solution of the equation $P(x)'m$ mod n) is calculated. $P(x)$ is a permutation polynomial modulo n (see Lidl and Niederreiter, Finite Fields, Encyclopedia of Mathematics, vol. 20, Cambridge University Press 1983); and s represents the digital signature of the message m.

A valid signature s of the message m is produced in that a product n is formed from the two prime numbers p, q, and the digital signature s is determined by the equation $$s = b \cdot u \cdot p + a \cdot v \cdot q \bmod n$$

and, on the basis of the equation $$1 = u \cdot p + v \cdot q,$$

values u, v and values a, b are calculated using the extended Euclidean algorithm using equation $$ggT(P(x)-m,\ x^p-x) \bmod p = x-a$$

$$ggT(P(x)-m,\ x^q-x) \bmod q = x-b,$$

and $P(x)$ is any permutation polynomial.

In a further example embodiment of the present invention, the secret key is formed by the number $(p-1)(q-1)+1$ from the prime numbers p and q, and digital signature s is formed according to the equation $$ggT(P(x)-m,\ x^{((p-1)(q-1)+1)}-x) \bmod n = x-s$$

If permutation polynomials over a finite field are used for $P(x)$, then the greatest common divisor, i.e. the signature, is a linear factor. Equally, it is possible, instead of the aforementioned number $(p-1)(q-1)+1$, to use its equivalent number which is calculated as follows:

$$\text{constant} \cdot kgV((p-1),(q-1))+1$$

In accordance with another embodiment of the method according to the present invention, generalized RSA polynomials of the form $rx^e+s$ mod n or Chebyshev polynomials $T_e(x)$ mod n or Dickson polynomials or, alternatively, a combination of these polynomials is used as permutation polynomials $P(x)$. Chebyshev polynomials are described, for example, in I. Schur, "Arithmetisches über die Tschebyscheffschen Polynome", (Arithmetic Aspects of Chebyshev Polynomials) in Gesammelte Abhandlungen, (Collected Treatises) volume III, pp. 422–453, Springer-Verlag, Berlin, Heidelberg, New York, 1973.

The present invention may provide a method for storing the manner in which the Chebyshev, generalized RSA, and/or Dickson transformation are consecutively executed, in the form of a vector, as part of the public key.

Especially preferred is an implementation of the method in which permutation polynomials of the form $rx^e+s$ mod n and $ggT(e,(p^2-1)(q^2-1))=1$ are nested with Dickson polynomials.

Another embodiment of the present invention provides for using permutation polynomials of the form $$P(x)=p^{-1}(x) o\ x^e\ o\ p(x)\ \text{mod}\ n,$$

$p^{-1}(x)$ being the inverse polynomial of $p(x)$,
$p^{-1}(x)$ and $p(x)$ being permutation polynomials modulo n, it holding that $ggT(e,(p-1)q-1))=1$, and the symbol "o" symbolizing the consecutive execution of the associated function, such as $A(x)\ o\ B(x)=A(B(x))$.

DETAILED DESCRIPTION

The public-key signature method according to the present invention based on the mathematical problem of factoring two large prime numbers. Therefore, two large prime numbers are used for the secret key, and the public key is formed from the product of those two numbers.

It is preferable for the method of the present invention that, in addition to the two prime numbers, use is made of permutation polynomials defined over a ring $Z_n$. A permutation polynomial over $Z_n$ is a polynomial which, considered as a function, induces a permutation of the set $\{0.1\ldots n-1\}$. An overview of the permutation polynomial theory is provided in the book by Lidl and Niederreiter "Finite Fields", Encyclopedia of Mathematics, vol. 20, Cambridge University Press 1983.

Therefore, in the public-key signature method, two large prime numbers p and q are used for the secret key. The public key is made up of a permutation polynomial $P(x)$ and product n of prime numbers p and q.

If a message m is to be signed by a sender, then, first of all, the greatest common divisor of the polynomials $p(x)=P(x)-m$ mod p and $x^p-x$ over the finite field $GF(p)$ is formed using the Euclidean algorithm Since $p(x)$ is a permutation polynomial, the greatest common divisor ("ggt") results as a linear factor and it provides that $$ggt(p(x), x^p-x)=x-a.$$

In the same manner, the greatest common divisor of the polynomials $p(x)=P(x)-m$ mod q and $x^q-x$ over the finite field $GF(q)$ is formed. Once again, $p(x)$ is a permutation polynomial, with the result that the greatest common divisor is a linear factor which is calculated as follows $$ggt(p(x), x^q-x)=x-b$$

Using the extended Euclidean algorithm, the relation $1=up+vq$ is calculated, with the result that, using the determined values a and b, it is possible to calculate the signature of the message m with $$s=b\cdot u\cdot p+a\cdot v\cdot q.$$

To allow the recipient of the message m to verify the thus formed signature, the public key is used which includes the permutation polynomial $P(x)$ and the product n of the prime numbers p, q. For this purpose, the polynomial $P(x)-m$ mod n is evaluated at the place value s with the result that, if the equation $$P(s)-m\ \text{mod}\ n=0$$

is satisfied, the validity of signature s is confirmed.

The method according to the present invention for signing a message and for verifying this signature is explained in greater detail in the following with reference to a numerical example, the numerical values chosen being very small for the sake of clarity. The prime numbers p=1237 and q=5683 are chosen as the secret key, with the result that the product $n=p\cdot q=7029871$. The public key is given by the polynomial $P(x)=2345678x^5+3456789$ mod n and the product n. The message is to be signed m=1234567. With the product n, the polynomial $P(x)$ results as $$P(x)-m=2345678x^5+2222222$$

Next, the two polynomials $$p(x)=P(x)-m\ \text{mod}\ p=326x^5+570\ \text{and}$$

$$q(x)=P(x)-m\ \text{mod}\ q=4282x^5+169$$

are formed. Thereafter, the greatest common divisors of the polynomials $p(x)$ and $q(x)$ can be calculated using the polynomials $x^p-x$ and $x^q-x$, respectively:

$$x-a=ggT(326x^5+570, x^{1237}-x)\ \text{mod}\ p=x+211$$

$$x-b=ggT(4282x^5+169, x^{5683}-x)\ \text{mod}\ q=x+864$$

This yields the values for a=1026 and b=4819.

From the extended Euclidean algorithm, with the relation $1=up+vq$, one obtains the representation $$-2683\cdot p+584\cdot q=1$$

where u −2683 and v=584 (see E. R. Berkkamp, Algebraic Coding Theory, Aegean Park Press, 1984, pp. 21–24).

With these values, it is now possible to calculate the signature s:

$$s=-2683\cdot p\cdot b+584\cdot q\cdot a\ \text{mod}\ n=2022284.$$

If the message m to be signed is greater than the product n, then the message is broken up into blocks which are individually signed, or a so-called hash value of the message m is signed.

To verify this signature, the public key can be used which is formed from the polynomial $P(x)$ and the product n. To verify the signature, the equation $$P(s)-m\ \text{mod}\ n=0$$

must be satisfied. With the numerical values, the result is that s is a valid signature of the message m.

It is also possible to use more than two prime numbers as the secret key, it then being necessary for the described method to be executed analogously.

What is claimed is:

1. A method for generating a digital signature ("s") of a message ("m"), comprising the step of:
   determining a secret key as a function of a first large prime number ("p") and a second large prime number ("q"); and
   generating the digital signature as a function of p and q, the digital signature being a zero value of a polynomial $P(x)-m$ modulo n, wherein:
n is a product of p and q, and
P(x) is a permutation polynomial modulo n, the permutation polynomial being a Chebyshev polynomial represented as T(x) mod n, $$s = b \cdot u \cdot p + a \cdot v \cdot q \bmod n,$$

$$u \cdot p + v \cdot q = 1, \text{ and}$$

a, b, u and v are value which are calculated with an extended Euclidean algorithm using the equations:

$$ggT(P(x)-m, X^p-x) \bmod p = x-a, \text{ and}$$

$$ggT(P(x)-m, X^q-x) \bmod q = x-b.$$

2. A method for generating a digital signature ("s") of a message ("m"), comprising the step of:
determining a secret key as a function of a first large prime number ("p") and a second large prime number ("q"); and
generating the digital signature as a function of p and q, the digital signature being a zero value of a polynomial P(x)−m modulo n,
wherein:
n is a product of p and q, and
P(x) is a permutation polynomial modulo n, the permutation polynomial being a Dickson polynomial, $$s = b \cdot u \cdot p + a \cdot v \cdot q \bmod n,$$

$$u \cdot p + v \cdot q = 1, \text{ and}$$

a, b, u and v are values which are calculated with an extended Euclidean algorithm using the equations:

$$ggT(P(x)-m, X^p-x) \bmod p = x-a, \text{ and}$$

$$ggT(P(x)-m, X^q-x) \bmod q = x-b.$$

3. A method for generating a digital signature ("s") of a message ("m"), comprising the steps of:
determining a secret key as a function of a first large prime number ("p") and a second large prime number ("q"); and
generating the digital signature as a function of p and q, the digital signature being a zero value of a polynomial P(x)−m modulo n,
wherein:
n is a product of p and q, and
P(x) is a permutation polynomial modulo n, $$s = b \cdot u \cdot p + a \cdot v \cdot q \bmod n,$$

$$u \cdot p + v \cdot q = 1, \text{ and}$$

a, b, u and v are values which are calculated with an extended Euclidean algorithm using the equations:

$$ggT(P(x)-m, X^p-x) \bmod p = x-a, \text{ and}$$

$$ggT(P(x)-m, X^q-x) \bmod q = x-b,$$

the permutation polynomial being a combination of a Chebyshev polynomial, a Dickson polynomial and a particular polynomial having the form of $r \cdot x^e + s$ which is an RSA polynomial, and wherein r and s are constant variables, and e is an exponent.

4. A method for generating a digital signature ("s") of a message ("m"), comprising the steps of:
determining a secret key as a function of a first large prime number ("p") and a second large prime number ("q");
generating the digital signature as a function of p and q, the digital signature being a zero value of a polynomial P(x)−m modulo n;
consecutively executing at least one of a Chebyshev polynomial, a Dickson polynomial and a generalized RSA polynomial to form a particular result; and
storing the particular result in the form of a vector as a portion of a public key for the digital signature;
wherein:
n is a product of p and q, and
P(x) is a permutation polynomial modulo n,s $$s = b \cdot u \cdot p + a \cdot v \cdot q \bmod n,$$

$$u \cdot p + v \cdot q = 1, \text{ and}$$

a, b, u and v are values which are calculated with an extended Euclidean algorithm using the equations:

$$ggT(P(x)-m, X^p-x) \bmod p = x-a, \text{ and}$$

$$ggT(P(x)-m, X^q-x) \bmod q = x-b.$$

5. A method for generating a digital signature ("s") of a message ("m"), comprising the steps of:
generating a secret key according to one of i) an equation (p−1)(q−1)+1, and ii) an equation kgV((p−1), (q−1))+1, where p is a first large prime number and q is a second large prime number; and
generating the digital signature as a function of p and q, the digital signature being a zero value of a polynomial P(x)−m modulo n, n being determined as a function of the first large prime number and the second large prime number, the digital signal being determined according to the equation:

$$ggT(P(x)-m, x^{((p-1)(q-1)+1)}-x) \bmod n = x-s,$$

wherein the permutation polynomial is a Chebyshev polynomial represented as T(x) mod n.

6. A method for generating a digital signature ("s") of a message ("m"), comprising the steps of:
generating a secret key according to one of i) an equation (p−1)(q−1)+1, and ii) an equation kgV((p−1), (q−1))+1, where p is a first large prime number and q is a second large prime number; and
generating the digital signature as a function of p and q, the digital signature being a zero value of a polynomial P(x)−m modulo n, n being determined as a function of the first large prime number and the second large prime number, the digital signal being determined according to the equation:

$$ggT(P(x)-m, x^{((p-1)(q-1)+1)}-x) \bmod n = x-s,$$

wherein the polynomial is a Dickson polynomial.

7. A method for generating a digital signature ("s") of a message ("m"), comprising the steps of:
generating a secret key according to one of i) an equation (p−1)(q−1)+1, and ii) an equation kgV((p−1), (q−1))+1, where p is a first large prime number and q is a second large prime number; and
generating the digital signature as a function of p and q, the digital signature being a zero value of a permutation polynomial P(x)−m modulo n, n being determined as a function of the first large prime number and the second large prime number, the digital signal being determined according to the equation:

$$ggT(P(x)-m, x^{((p-1)(q-1)+1)}-x) \mod n=x-s,$$

wherein the permutation polynomial is a combination of a Chebyshev polynomial, a Dickson polynomial and a particular polynomial having the form of $r \cdot x^e + s$ which is an RSA polynomial, and wherein r and s are constant variables, and e is an exponent.

8. A method for generating a digital signature ("s") of a message ("m"), comprising the steps of:

generating a secret key according to one of i) an equation (p−1)(q−1)+1, and ii) an equation kgV((p−1), (q−1))+1, where p is a first large prime number and q is a second large prime number;

generating the digital signature as a function of p and q, the digital signature being a zero value of a polynomial P(x)−m modulo n, n being determined as a function of the first large prime number and the second large prime number, the digital signal being determined according to the equation:

$$ggT(P(x)-m, x^{((p-1)(q-1)+1)}-x) \mod n=x-s;$$

consecutively executing at least one of a Chebyshev polynomial, a Dickson polynomial and a generalized RSA polynomial to form a particular result; and storing the particular result in the form of a vector as a portion of a public key for the digital signature.

9. A method for verifying a digital signature ("s") of a message ("m"), comprising the steps of:

receiving a digital signature, the digital signature being determined as a function of a secret key, the secret key being determined according to one of i) an equation (p−1)(q−1)+1, and ii) an equation kgV((p−1), (q−1))+1, where p is a first large prime number and q is a second large prime number, the digital signature being determined as a function of p and q, and being a zero value of a polynomial P(x)−m modulo n, n being determined as a function of the first large prime number and the second large prime number, the digital signal being determined according to the equation:

$$ggT(P(x)-m, x^{((p-1)(q-1)+1)}-x) \mod n=x-s; \text{ and}$$

verifying if the digital signature is valid by determining if the following equation is satisfied:

$$P(s)-m \mod n=0.$$

* * * * *